United States Patent [19]

Furuta

[11] Patent Number: 4,974,891

[45] Date of Patent: Dec. 4, 1990

[54] DYNAMIC DAMPING TYPE BUMPER FOR MOTOR VEHICLE

[75] Inventor: Katsumi Furuta, Zama, Japan

[73] Assignee: Nissan Motor Co., Ltd., Yokohama, Japan

[21] Appl. No.: 500,092

[22] Filed: Mar. 21, 1990

Related U.S. Application Data

[63] Continuation of Ser. No. 367,078, Jun. 16, 1989, abandoned, which is a continuation of Ser. No. 117,854, Nov. 6, 1987, abandoned.

[30] Foreign Application Priority Data

Nov. 14, 1986 [JP] Japan .................................. 61-175041

[51] Int. Cl.$^5$ .............................................. B60R 19/00
[52] U.S. Cl. ..................................... 293/104; 293/120; 293/155
[58] Field of Search ................ 293/104, 102, 120, 121, 293/122, 132, 133, 135, 155, 136; 267/139, 140

[56] References Cited

U.S. PATENT DOCUMENTS

| | | | |
|---|---|---|---|
| 3,869,164 | 3/1975 | Schwenk | 293/136 |
| 3,926,462 | 12/1975 | Burns et al. | 293/136 |
| 3,933,387 | 1/1976 | Salloum et al. | 293/120 |
| 4,186,915 | 2/1980 | Zeller et al. | 293/122 X |
| 4,328,986 | 5/1982 | Weller et al. | 293/120 |
| 4,460,206 | 7/1984 | Peter | 293/132 |
| 4,465,312 | 8/1984 | Werner | 293/104 X |
| 4,509,781 | 4/1985 | Dick et al. | 293/104 |
| 4,783,104 | 11/1988 | Watanabe et al. | 293/102 |
| 4,830,416 | 5/1989 | Matsuoka | 293/120 |

FOREIGN PATENT DOCUMENTS

| | | | |
|---|---|---|---|
| 0150636 | 8/1985 | European Pat. Off. | 293/121 |
| 3342332 | 6/1984 | Fed. Rep. of Germany | 293/132 |
| 3305440 | 8/1984 | Fed. Rep. of Germany | 293/102 |
| 0066084 | 4/1982 | Japan | 293/102 |
| 0136542 | 8/1983 | Japan | 293/132 |
| 0004444 | 1/1985 | Japan | 293/104 |
| 60-112736 | 7/1985 | Japan . | |

Primary Examiner—Douglas C. Butler
Attorney, Agent, or Firm—Pennie & Edmonds

[57] ABSTRACT

A bumper of a so-called dynamic damper type, which comprises a considerably heavy armature, bushing-mounted holders for connecting the armature to bumper stays of a vehicle body with an interposal of elastic member therebetween, and a bumper facia covering the armature and secured to the vehicle body other than the bumper stays.

8 Claims, 2 Drawing Sheets

DYNAMIC DAMPING TYPE BUMPER FOR MOTOR VEHICLE

This application is a continuation of application Ser. No. 07/367,078 filed June 16, 1989, now abandoned, which application is a continuation of Ser. No. 07/117,854 filed Nov. 6, 1987, now abandoned.

BACKGROUND OF THE INVENTION

1. Field of the Invention

The present invention relates in general to bumpers for a motor vehicle, and more particularly to bumpers of a type which can serve as a so-called dynamic damper.

2. Description of the Prior Art

Nowadays, some of wheeled motor vehicles are equipped with a bumper of so-called dynamic damper type in order to reduce unpleasant vibration of the vehicle body caused by engine operation particularly at idling. In such bumper, the weight of the same is use as a damping mass. One of the conventional bumpers of such type is disclosed in Japanese Utility Model Provisional publication No. 60-112736, which, as shown in FIGS. 2 and 3 of the attached drawings, uses both a bumper facia A and an armature B, which have considerable weights, as a damping mass. For this, bumper stays C are secured to laterally spaced rigid portions of the vehicle body, and supporting brackets D are secured to leading ends of the bumper stays C respectively. Each bracket D has upper and lower walls between which an inboard part of the armature B is spacedly received. Between each wall of the bracket D and the armature B, there is arranged a bushing-mounted holder E1 or E2 for elastically holding the armature B to the bracket D. Each holder E1 or E2 comprises a bushing mounted to the associated wall of the bracket D and a set of bolt and nut for connecting the bushing to the armature B. The bumper facia A covers an outboard part of the armature and is secured to the same by means of upper and lower brackets secured thereto. Although not shown in the drawing, the armature B has suitable portions which are secured to the bumper stays C directly.

With the construction as described hereinabove, it will be appreciated that the bumper facia A and the armature 8 constitute an integrated unit which has a specific vibration mode different from that of the vehicle body, because the unit is supported by the vehicle body through the bushing-mounted holders E1 and E2. Thus, the unpleasant vibration of the vehicle body at idling is suppressed or at least damped.

However, in the conventional bumpers of the above-mentioned type suffer from the following drawbacks because of the inherency in construction.

That is, because the unit of the bumper facia A and the armature 8 vibrates at its specific frequency different from that of the vehicle body, the vibration of the bumper facia A is clearly observed. This tends to provide the observers with unpleasant feeling.

Furthermore, since the bumper facia A vibrates freely relative to the vehicle body, it is necessary to provide a considerable clearance H between the bumper facia A (viz., an upper surface of the same, see FIG. 2) and a lower part (viz., a front lower part F of an engine hood) of the vehicle body. The provision of such clearance H deteriorates external view of the vehicle.

SUMMARY OF THE INVENTION

It is therefore an object of the present invention to provide an improved bumper of the dynamic damper type, which is free of the above-mentioned drawbacks.

According to the present invention, there is provided an improved bumper of a dynamic damper type, in which only the armature is used as the damper mass.

According to the present invention, there is provided, in a motor vehicle having a vehicle body and bumper stays secured to the vehicle body, a bumper which comprises an armature having a weight which is sufficient for constituting a damping mass for damping a vibration of the vehicle body, means for connecting the armature to each of the bumper stays with an interposal of an elastic member therebetween, and a bumper facia covering the armature and secured to the vehicle body other than the bumper stays.

DETAILED DESCRIPTION OF THE INVENTION

Figure 1:
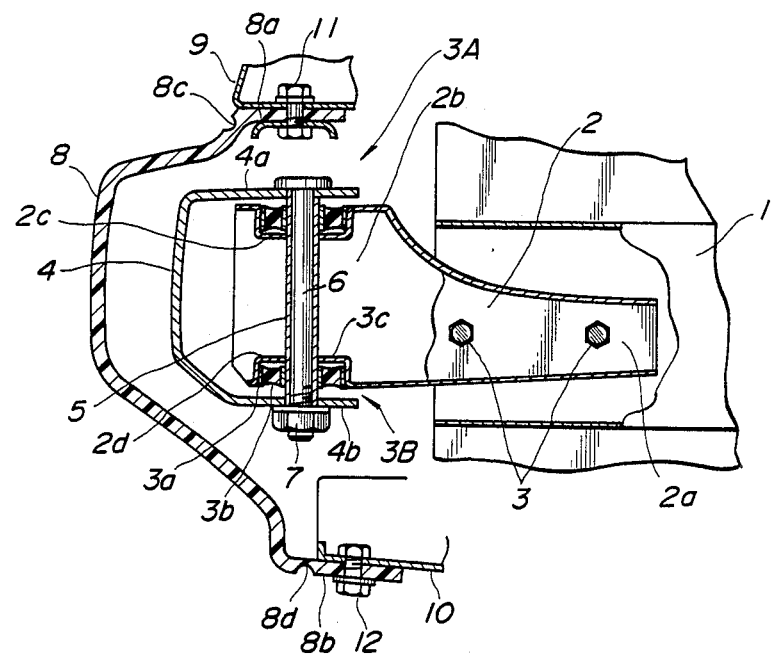
FIG. 1 is a sectional view of a bumper of the present invention, which view corresponds to that of FIG. 3.
Figure 2:
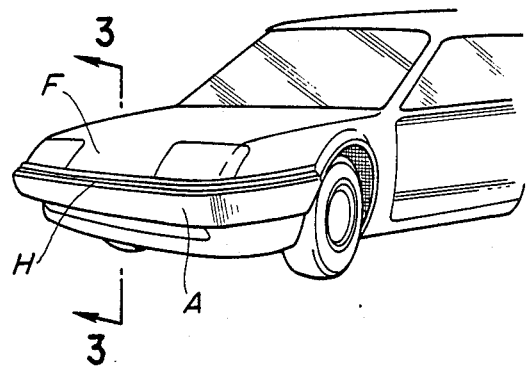
FIG. 2 is a perspective view of a passenger motor vehicle to which a conventional bumper of dynamic damper type is mounted.

Referring to FIG. 1, there is shown a bumper of the present invention, which is practically applied to a front portion of a motor vehicle. Designated by numeral 1 is one of front side members which are mounted to the vehicle body to reinforce the same.

Two bumper stays 2 are secured at their base portions 2a to the front side members 1 by means of bolts 3 and nuts. An elongate armature 4 having a generally U-shaped cross section extends laterally along the front portion of the vehicle body and is connected to the bumper stays 2 by means of upper and lower holders 3A and 3B. The armature 4 is constructed of a rigid metal, such as steel or the like. As will become apparent as the description proceeds, in the present invention, only the armature 4 constitutes the damping mass against the vibration of the vehicle body.

As is seen from the drawing, each bumper stay 2 is enlarged at the forwardly projected portion. The enlarged portion is formed at its upper and lower sides with flanged recesses 2c and 2d which face upward and downward respectively, as shown. The bottoms of the recesses 2c and 2d are formed with aligned openings (no numerals) through which a supporting pipe 5 passes having its upper and lower ends in abutment with the inside surfaces of the upper and lower walls 4a and 4b of the armature 4. The portions of the upper and lower walls 4a and 4b to which the pipe 5 contacts are formed with aligned openings (no numerals) through which a headed bolt 6 passes while being inserted through the pipe 5. A threaded lower end portion of the bolt 6 is projected outwardly from the lower wall 4b of the armature 4 and tightly coupled with a nut 7. With this, an integrated unit including the armature 4, the pipe 5 and the bolt 6 is constituted, which is vertically movable relative to the bumper stay 2. In order to suppress this movement, the following measure is further employed in the invention.

That is, a pair of annular bushings are provided for each bumper stay 2 in order to elastically hold the armature 4 to the bumper stay 2. The annular bushings are respectively received in the flanged recesses 2c and 2d while surrounding the pipe 5. Each bushing comprises an annular elastic member 3b made of rubber or the like, an outer ring 3a covering an outer periphery of the elastic member 3b and welded to the cylindrical wall of the flanged recess 2c or 2d and an inner ring 3c covering an inner periphery of the elastic member 3b and welded to the pipe 5. It is to be noted that upon assembly, the elastic member 3b of each bushing is compressed between the cylindrical wall of the flanged recess 2c or 3c and the pipe 5 in order to achieve an elastic connection therebetween.

A bumper facia 8 made of plastics or the like extends along the elongate armature 4 with a suitable clearance therebetween. As shown, the bumper facia 8 is arranged to conceal the armature 4 from the outside, and comprises a channel-like major portion and upper and lower flange portions 8a and 8b. The upper flange portion 8a is connected, by means of bolts 11 and nuts, to a part of the vehicle body, for example, to a rigid panel 9 located below a radiator grill (not shown) of the vehicle, while, the lower flange portion 8b is connected, by means of bolts 12 and nuts, to a front lower cross member 10 of the vehicle body. It is to be noted that there is no direct connection between the bumper facia 8 and the armature 4. Designated by numerals 8c and 8d are longitudinally extending grooves which are provided for weakening the mechanical strength of the portions of the bumper facia 8 where the grooves are formed.

As is understood from the foregoing description, in accordance with the present invention, only the armature 4 and some parts directly connected therewith serve as a damping mass against the vibration of the vehicle body. That is, the armature 4 and the associated parts are supported by the vehicle body through the elastic member-mounted holders 3A and 38, while the bumper facia 8 is directly connected to the vehicle body.

Figure 3:
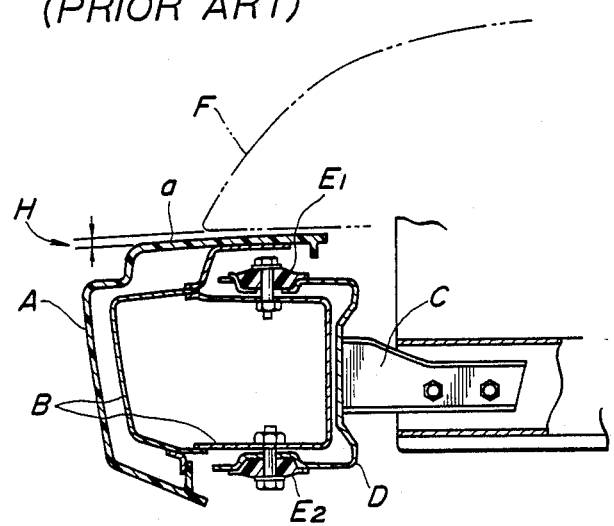
FIG. 3 is a sectional view of the conventional bumper, which view is taken along the line III—III of FIG. 2.

Because of the direct connection of the bumper facia 8 to the vehicle body, the bumper facia 8 vibrates in the same manner as the vehicle body. However, this vibration is negligible as compared with the vibration of the armature 4. Furthermore, since the armature 4 is concealed by the bumper facia 8, the unpleasant vibration of the same is not observed from the outside. The direction connection of the bumper facia 8 to the vehicle body makes the unsightly clearance (viz., H, see FIG. 3) unnecessary.

What is claimed is:

1. In a motor vehicle having a vehicle body and bumper stays secured to said vehicle body, a dynamic damping type bumper which comprises:
    an elongated armature having a weight which is sufficient for constituting a damping mass for damping a vibration of said vehicle body, said armature being constructed of metal;
    connecting means connecting said armature to each of said bumper stays with an interposal of an elastic member therebetween such that the elongated dimension of said armature is spaced from and movable relative to said vehicle body; and
    a bumper facia of a plastic extending along said elongate armature with no portion thereof contacting said armature, said bumper facia being secured to portions of the vehicle body other than said armature so as to cover said elongated armature from view, whereby only said armature vibrates relative to said vehicle body, without interference by said facia, thereby dampening vibration of said vehicle body without substantial vibration of said facia relative to said vehicle body.

2. A bumper as claimed in claim 1, in which said means comprises a pair of bushings which are arranged in parallel between each of said bumper stays and said armature.

3. A bumper as claimed in claim 1, in which said elongated metal member has a generally U-shaped cross section.

4. A bumper as claimed in claim 3, in which said means comprises:
    means forming upper and lower portions of each bumper stay with recesses;
    means forming the bottoms of recesses with mutually aligned openings;
    a tube passing through said aligned openigs having its upper and lower ends in abutment with inside surfaces of upper and lower walls of said armature;
    means forming said upper and lower walls of said armature, at the portions to which said upper and lower ends of the tube contact, with mutually aligned openings;
    a bolt passing through the tube with its upper and lower end portions passing through the openings of the armature;
    a nut coupled with one end of said bolt to tightly connect the bolt to said armature; and
    a pair of bushings respectively received in the recesses of the bumper stay in such a manner that each bushing is compressed between a wall of the associated recess and said tube.

5. A bumper as claimed in claim 4, in which each of the bushings comprises:
    an annular elastic member;
    an outer ring covering an outer periphery of said elastic member and welded to said wall of the associated recess of the bumper stay; and
    an inner ring covering an inner periphery of said elastic member and welded to said tube.

6. A bumper as claimed in claim 5, in which each of said bumper stays is enlarged in size at the portion where said recesses are formed.

7. A bumper as claimed in claim 5, in which said bumper facia is made of a plastics and comprises:
    an elongate major portion extending along the elongate armature with a clearance therebetween;
    an upper flange portion bolted to a rigid member of said vehicle body; and
    a lower flange portion bolted to another rigid member of said vehicle body.

8. A bumper as claimed in claim 7, in which said bumper facia is formed near said upper and lower flange portions with grooves for weakening the mechanical strength of the portions where the grooves are formed.

* * * * *